Figure 1:
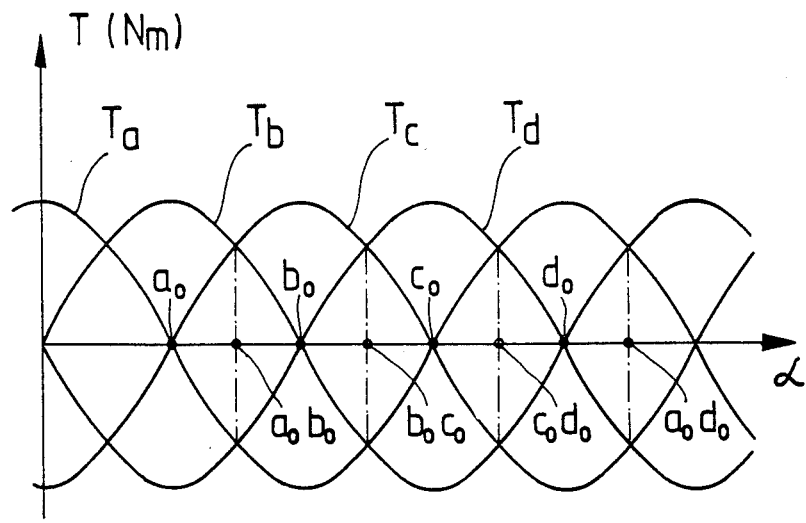

United States Patent [19]

Antognini

[11] Patent Number: 4,556,836
[45] Date of Patent: Dec. 3, 1985

[54] MULTIPHASE MOTOR DAMPING METHOD AND CIRCUIT ARRANGEMENT

[75] Inventor: Luciano Antognini, Sonceboz, Switzerland

[73] Assignee: Societe Industrielle de Sonceboz S.A., Berne, Switzerland

[21] Appl. No.: 611,302

[22] Filed: May 17, 1984

[30] Foreign Application Priority Data

May 24, 1983 [CH] Switzerland .................. 2796/83

[51] Int. Cl.⁴ .......................................... H02K 29/04
[52] U.S. Cl. .................................. 318/696; 318/685; 368/157
[58] Field of Search ................ 318/685, 696; 368/157

[56] References Cited

U.S. PATENT DOCUMENTS

| 3,727,121 | 4/1973 | Rich | 318/696 |
|---|---|---|---|
| 3,986,047 | 10/1976 | Griess | 323/243 |
| 4,229,690 | 10/1980 | Avidan | 323/242 |
| 4,266,177 | 5/1981 | Nola | 318/812 |
| 4,334,183 | 6/1982 | Havenstein | 323/235 |
| 4,400,657 | 8/1983 | Nola | 318/729 |

FOREIGN PATENT DOCUMENTS 60806 9/1982 European Pat. Off. .

Primary Examiner—William M. Shoop, Jr.
Assistant Examiner—Saul M. Bergmann
Attorney, Agent, or Firm—Pollock, Vande Sande and Priddy

[57] ABSTRACT

A method by means of which the damping of the rotor and of the load of a multiphase motor can be increased when it is desired to stop the rotor and the load in a certain position consists in measuring the voltages induced by the movement of the rotor in the different stator phase windings and modifying the currents applied to these windings as a function of the measurements made, so as to produce an electromagnetic-type damping torque. A device for carrying out this method comprises circuitry for measuring the induced voltages in the phase windings and circuitry by means of which currents depending on such measurements of the induced voltages can be applied to these phase windings.

11 Claims, 7 Drawing Figures

MULTIPHASE MOTOR DAMPING METHOD AND CIRCUIT ARRANGEMENT

This invention relates to the operation of electric motors, and more particularly to a method of improving damping upon stopping of the movement of the rotor of a multiphase motor comprising several stator windings magnetically coupled to the rotor, of the type wherein currents are allowed to flow through these phase windings.

This invention further relates to a circuit arrangement for carrying out the aforementioned method.

Stepping motors are used in numerous devices where a mechanical component must be displaced by increments. They make it possible to convert numerical data into mechanical data. In many cases, the load of the system is an inertial load, with little or no friction. The most frequent requirement is to bring the load into a certain position and immobilize it there in as short a time as possible.

Experience has shown that the movement of the rotor and of the load around the final position is very oscillatory. This behavior is the very consequence of the incremental nature of this type of motor. A stepping motor comprises a rotor magnetically coupled to a number of stator windings. To reach a certain position of equilibrium, one or more sets of windings are excited in such a way that, for that position, the sum of the torques produced by the magnetic fields created by the stator windings is cancelled.

Near the position of equilibrium, however, the motor torque acts in the manner of a spring; and because of the low damping of the system, the rotor and the load tend to oscillate strongly around the ultimate position. The immobilization of the load in a precise position is therefore slow, and the performance of the system is thus limited.

Several solutions have already been proposed for improving the damping of the movement of the motor and of the load around the ultimate position. A first solution consists in using a mechanical damping system. This technique has the disadvantage of using an additional mechanical element, increasing the inertia of the motor, and decreasing its dynamic performance. The addition of this extra element makes this method expensive and impractical.

Another technique is described in U.S. Pat. No. 3,965,406. This method consists in braking the movement of the stepping motor prior to detent by reversing the phases for a moment so as to produce a braking torque, immobilizing the rotor and the load in the desired position. However, this technique is delicate to adjust because the exact speed and position of the rotor are not known at the moment of braking. A slight variation of the inertia or friction in the system therefore has a direct effect upon the quality of the response obtained.

U.S. Pat. No. 3,760,252 proposes detecting by means of a sensor the position starting from which braking is desirable. This braking is produced by feeding all the phase windings of the motor simultaneously, creating electromagnetic damping by means of the coupling between the rotor and the phase windings. This solution necessitates the use of a position sensor and nevertheless remains sensitive to the variations of inertia and friction in the system.

European Patent Application Publication No. 0 022 457 A1 proposes a method and a circuit for controlling the detent position of the multiphase stepping motor. This publication discloses an arrangement in which a transducer (16, FIG. 1; 21, FIG. 11) coupled to the motor, supplies data in relation to the speed of rotation of the rotor. The voltage signals supplied by this transducer are used in conjunction with a control circuit to brake the motor upon approaching its detent position. This prior disclosure is not based upon a measurement of induced voltage extracted from the phase windings of the motor but upon speed data obtained with the aid of an additional transducer.

All of these first prior art solutions thus require an additional mechanical element, either a mechanical damping device or a sensor, or else they act on the supposition that at a precise moment, the rotor is in a certain position at a certain speed, which makes it very sensitive to variations in the parameters of the system.

Other previously disclosed devices avoid the shortcoming of having to use a special angular sensor.

First of all, there are the published patent applications DE-A-No. 23 48 121 and EP-A-No. 0 059 969, both of which propose means for improving the pulse itself which is periodically supplied to a stepping motor, especially for stabilizing this pulse even if the feed voltage is not stable, but in such a way as not to have recourse to the "induced voltage" concept.

Published application EP-A-No. 0 087 172, on the other hand, proposes a method of controlling a stepping motor in which the concept of "induced voltage" does occur. It will be noted, however, that it has to do with the control of a stepping motor comprising only one winding and that the object is improved adjustment of the torque rather than better damping at the detent position. In the device according to this prior publication, the current in the winding is subject to a certain value in that a change-over switch short-circuits this winding as soon as the current therein exceeds a certain maximum, and connects this winding to the terminals of a voltage source as soon as the current drops below that maximum. The associated control device thus causes an alternating succession of short intervals during which the winding is supplied and short intervals during which it is short-circuited, these respective intervals being autonomous and of respective durations which depend on the inductance and are therefore related to the induced voltage. The measurement (or mutual relationship) of these intervals furnishes a parameter dependent upon the induced voltage without the latter's actually being measured or ascertained. The relationship between these intervals naturally also depends upon the reference value assigned arbitrarily to the current. At the end of the pulse, this reference value is reduced, and the change in the ratio of the short intervals is then observed. The pulse is considered optimum when the drop in the reference value is reflected in a particular given variation in the aforementioned ratio.

Although this prior disclosure involves the idea of "induced voltage," it does not treat it directly as such and provides no indication concerning a suitable way in which to improve the damping upon detent of a stepping motor, and most particularly of a multiphase stepping motor.

Published application EP-A-No. 0 036 931 proposes a damping control system for a stepping motor with a method of operation to which the concepts of inductance and induced voltage would not seem to be totally irrelevant. However, the device disclosed in this prior publication has recourse, in a manner somewhat similar to that of the preceding device, to a chopper control system. The instantaneous currents circulating in the phase windings of the motor are compared and regulated in relation to a triangular reference value, and thus damping controllable by action on these currents is obtained. The prior art device presents the disadvantage of requiring a chopper control system and does not utilize the "induced voltage" concept within the framework of its operation.

Finally, published application EP-A-No. 0 060 806 discloses a device having the principal object of reducing the power consumption of a stepping motor. In order to achieve that object, this device reconstitutes, by sampling, the voltage induced in the winding of a stepping motor. By means of this system of reconstitution, the evolution of the induced voltage is actually ascertained without having to undertake circuit-breaking or to resort to similar expedients. However, this publication does not at all propose using its method of reconstituting the evolution of the induced voltage in combination with means for improving the damping upon detent of a multiphase stepping motor. Such a combination of means would therefore be completely novel, making it possible to achieve advantages not thought of in the published European patent application cited above.

It is an object of this invention to provide a method and a circuit arrangement for improving the damping upon stopping of a multiphase motor, especially of the stepping type, in a way which is both simpler and more reliable than what has been made possible by the prior art.

A further object of this invention is to provide such a method and circuit arrangement which take suitable advantage as has not been envisaged theretofore, of the possibility of knowing at any moment the value, i.e., of knowing the evolution, of the voltage induced in the phase windings of the motor, by purely electronic means and without having to interrupt the current supply of these windings.

To this end, the method according to the present invention, of the type initially defined comprises the steps of measuring the voltages induced in the stator windings by the movement of the rotor and imparting to said currents values depending on the measurements of the induced voltages.

Furthermore, this method is characterized by the combination of the fact that the current applied to a cut-in phase winding is proportional to the algebraic sum of a reference value and a magnitude proportional to the instantaneous value of the induced voltage ascertained on that same winding, and of the fact that the ascertainment of that induced voltage is carried out point by point, on the basis of a repeated comparison, on successive elementary intervals of time between the true evolution of the value of the current and the simulated evolution which the value of the current would follow in the absence of induced voltage.

The circuit arrangement according to the present invention, for a multiphase motor including several stator windings magnetically coupled to the rotor, this arrangement comprising means for applying currents in the active phase windings of the motor, further comprises ascertaining means for carrying out the ascertainment of the induced voltages produced by the movement of the rotor in the different stator windings, and means for modifying the values of those currents in response to the signals supplied by the ascertaining means, the means for modifying the values of the currents including a circuit which produces the algebraic sum of a reference value and a magnitude proportional to the voltage induced in the respective phase winding.

It will be noted that the invention accords significant importance to the voltage induced by the movement of the rotor at the moment when it reaches its detent position, the idea of "induced tension" being linked to the idea of "speed of rotation". In this respect, we have the equation $$E_{mi} = \frac{\delta \psi i}{\delta \alpha} \cdot \omega \qquad (1)$$

wherein $E_{mi}$ is the voltage induced in phase winding i of the motor, $\psi_i$ is the flux associated with this winding i, $\delta \psi i/\delta \alpha$ is the derivative of this flux with respect to the angular position $\alpha$ of the rotor, and $\omega$ is the angular velocity of the rotor. Although the term $\delta \psi i/\delta \alpha$ is not constant and, in fact, varies as a function of the position, it will be shown below that the use of the induced voltage makes it possible to obtain constant damping independent of the position.

As mentioned above, the invention aims at providing a method by which the movement of a stepping motor can be damped by acting upon the currents of the active phase windings of the motor. The instantaneous torque of a multiphase stepping motor is connected with the currents flowing through the phase windings by the equation $$T = \sum_i \frac{\delta \psi i}{\delta \alpha} \cdot i_i \qquad (2)$$

wherein T is the total torque, $\psi_i$ is the flux associated with phase winding i, $\delta \psi i/\delta \alpha$ is the derivative of this flux with respect to the angular position of the rotor, and $i_i$ is the instantaneous current flowing through winding i. Only the windings through which a current passes contribute to the torque, and they shall be called active phase windings. The foregoing equation shows that if constant currents flow through the active phase windings of the motor, no term on the right side of this equation depends upon the speed. The instantaneous torque is therefore solely a function of the position, and the only torque depending on the speed and capable of creating damping is caused by the friction present in the system.

In order to introduce a damping torque of electromagnetic nature, the method according to the invention proposes modifying the currents passing through the active windings as a function of the speed, measured indirectly through the voltage induced by movement. As will be demonstrated below, this method makes it possible to create an electromagnetic damping torque equivalent to that of an ideal viscous damper.

One particularity of the invention is the possibility of feeding the windings of the stepping motor with either a constant voltage, permitting highspeed operation without damping, or currents dependent on the induced voltage, as will be explained below, in such a way that strong damping can be created. This circuit arrangement permits utilization of the power transistor present in a current supply. Hence an extra amplifier for regulating the current is no longer necessary, and the heat losses are borne by the elements already provided for this purpose.

It will be noted that the determination of the voltage induced by movement, based upon the analysis of the current wave passing through the active phase windings of the motor, plays an important part in the present invention.

Figure 3:
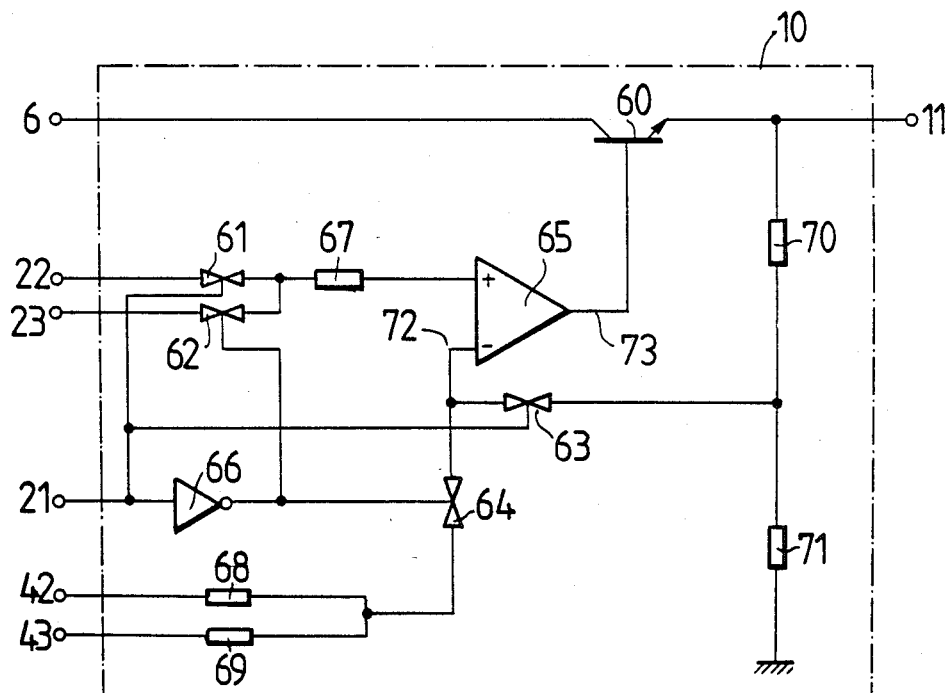
Figure 2:
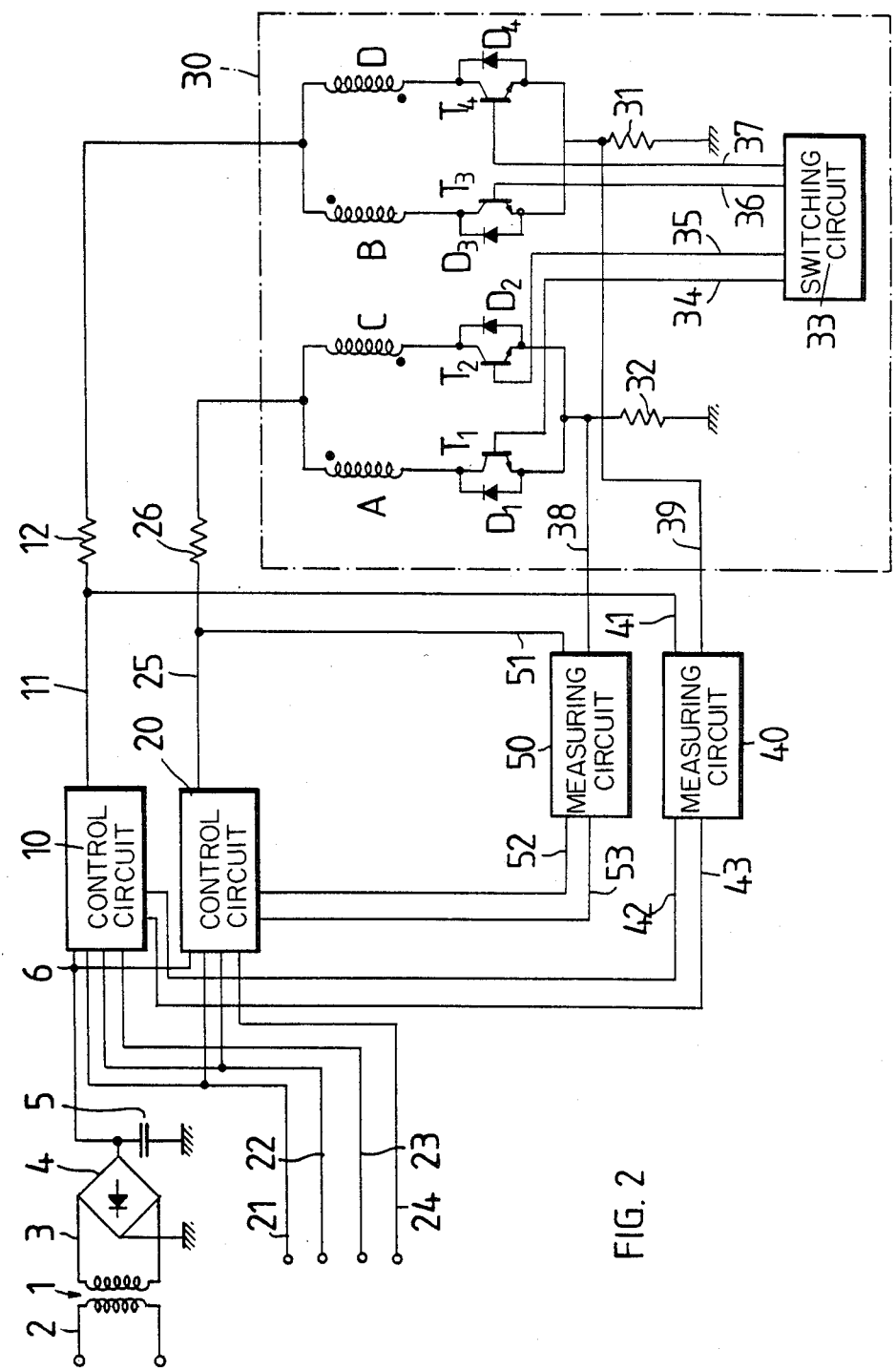
Figure 4:
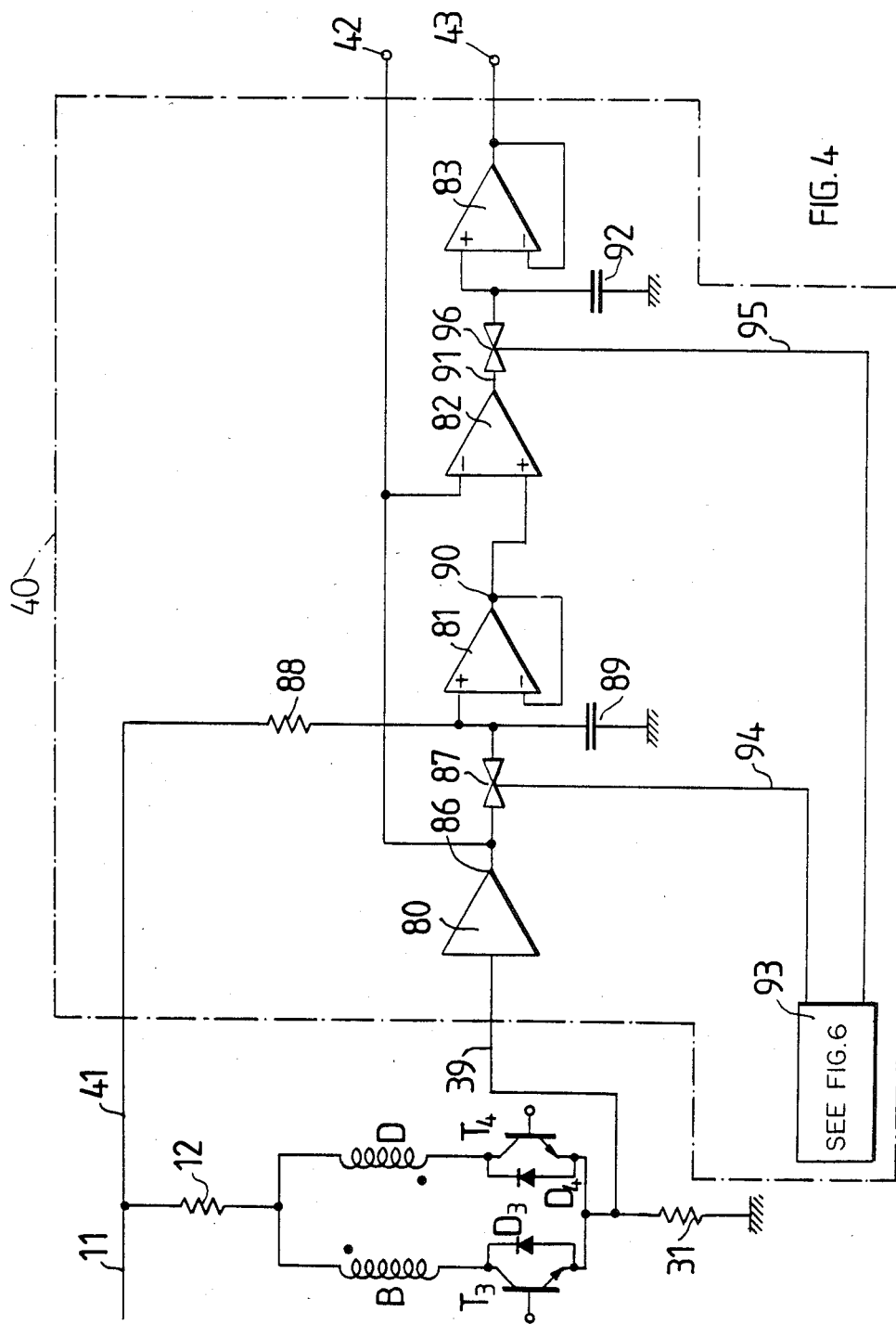
Figure 5:
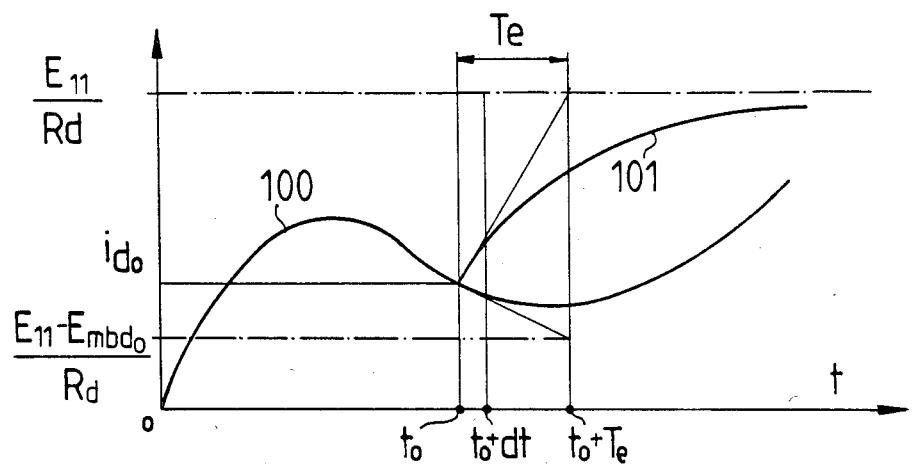
Figure 6:
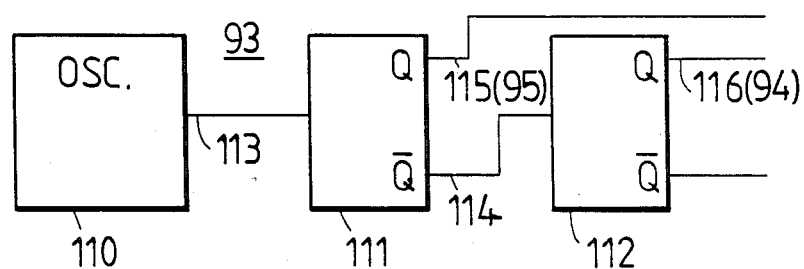
Figure 7:
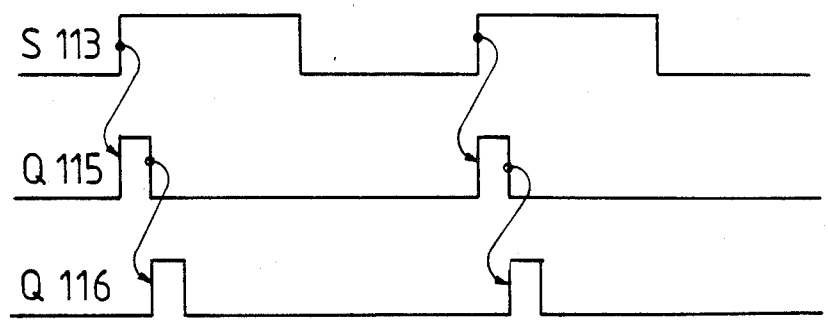

Other characteristics and advantages of the invention will become more fully apparent from the following detailed description of a preferred embodiment thereof, taken in conjunction with the accompanying drawings, in which:

FIG. 1 is a graph showing the static torque characteristics of a multiphase stepping motor, FIG. 2 is a block diagram of a circuit arrangement in the preferred embodiment of the invention, FIG. 3 is a diagram of a possible control circuit for controlling the current flowing through an active phase winding, FIG. 4 is a diagram of a possible circuit for measuring the voltage induced in the stator windings of the motor by the movement of the rotor, FIG. 5 is a graph illustrating the operation of the circuit of FIG. 4, FIG. 6 is a partial diagram of a possible circuit by means of which the necessary signals can be supplied to the measuring circuit of FIG. 4, and FIG. 7 is a graph illustrating the operation of the circuit of FIG. 6.

FIG. 1 shows the static torque characteristics produced by phase windings A, B, C, and D of a multiphase stepping motor when a current $i_o$ passes through these windings. It will be noted that these characteristics are perceptibly sinusoidal and that torques $T_a$, $T_b$, $T_c$, and $T_d$ (in N·m), generated by windings A, B, C, and D, respectively, satisfy the following equations:

$$T_a = k \cdot \sin(n \cdot \alpha) i_a \quad (3)$$

$$T_b = k \cdot \cos(n \cdot \alpha) i_b \quad (4)$$

$$T_c = k \cdot \sin(n \cdot \alpha) i_c \quad (5)$$

$$T_d = k \cdot \cos(n \cdot \alpha) i_d \quad (6)$$

wherein k is a constant dependent on the stepping motor in question and on its structural parameters, n is the number of teeth on the rotor of the motor, $\alpha$ is the angle of the rotor, and $i_a$, $i_b$, $i_c$, and $i_d$ represent the currents flowing through windings A, B, C, and D, respectively.

When it is desired to immobilize the rotor in a certain position, it is possible to act upon the different phase windings of the motor in various ways.

One possibility is to feed a single winding at a time. The rest position will therefore correspond to the position in which the torque produced by the winding in question is cancelled. In the case of winding A, the corresponding position of equilibrium $a_o$ is shown in FIG. 1, as are the positions of equilibrium $b_o$, $c_o$ and $d_o$, defined by windings B, C, and D.

A second possibility is to feed two phase windings simultaneously with two equal currents. In this case, the corresponding position of equilibrium will be defined by the angle where the sum of the torques produced by the two active windings is cancelled. In the case of windings A and B, this position of equilibrium $a_o b_o$ is shown in FIG. 1, as are the positions of equilibrium $b_o c_o$, $c_o d_o$, and $a_o d_o$, corresponding to the activation of windings B and C, C and D, and D and A, respectively.

A third possibility is to feed two phase windings simultaneously with different currents. If, for example, two currents $i_{ao}$ and $i_{bo}$ are passed through windings A and B, respectively, the position of equilibrium will correspond to the angle where the sum of the two individual torques is cancelled. Using equations (3) and (4) above, we have:

$$T_a + T_b = O = k[i_{ao} \cdot \sin(n \cdot \alpha) - i_{bo} \cdot \cos(n \cdot \alpha)] \quad (7)$$

Solving this equation for $\alpha$, we obtain $$\alpha = \frac{1}{n} \cdot \tan^{-1}\left(\frac{i_b}{i_a}\right) \quad (8)$$

This last equation shows that any position of equilibrium between the positions of equilibrium of the respective windings A and B can be attained. Analogous reasoning holds for windings B and C, C and D, and D and A. This technique is well known in the art as "ministepping."

These three modes of operation have a shortcoming in common; experience has shown that the movement of the rotor around its final position of equilibrium is highly oscillatory. The equation of movement when, for example, currents $i_{ao}$ and $i_{bo}$ pass through windings A and B, can be written $$I \cdot \dot{\omega} = k \cdot i_{ao} \cdot \sin(n \cdot \alpha) - k \cdot i_{bo} \cdot \cos(n \cdot \alpha) - F \cdot \omega \quad (9)$$

wherein I is the total inertia associated with the rotor, $\omega$ is the angular velocity of the rotor, $\dot{\omega}$ is its acceleration, and F is the coefficient of viscous friction present in the system.

Electromagnetic-type damping, caused by perturbation of the currents in the windings through voltage induced by movement, is very weak and even disappears completely if constant currents are applied in the active phase windings.

The method of the present invention, now to be described, makes it possible to generate an electromagnetic damping torque by modifying the currents flowing through the active phase windings as a function of the speed of the rotor.

As it is desired to avoid the use of an additional speed sensor, the relation existing between the voltage induced by movement and the speed is used to measure the latter indirectly. If we consider the case where windings A and B are active, the voltage induced in these two windings, designated as $E_{ma}$ and $E_{mb}$, satisfies the following two equations:

$$E_{ma} = +k \cdot n \cdot \omega \cdot \sin(n \cdot \alpha) \quad (10)$$

$$E_{mb} = -k \cdot n \cdot \omega \cdot \cos(n \cdot \alpha) \quad (11)$$

These two voltages, measured by a method to be described below, are directly proportional to the speed $\omega$ and can be used to act upon the current passing through the phase windings.

If the active windings A and B in our example are fed by two current sources supplying two currents $i_a$ and $i_b$ satisfying the following equations:

$$i_a = i_{ao} - g \cdot E_{ma}$$

$$i_b = i_{bo} - g \cdot E_{mb}$$

wherein $i_{ao}$ and $i_{bo}$ represent two reference values defining a position of equilibrium $\alpha$, and g is a gain which may be chosen in dependence upon the necessities of the adjustment, the instantaneous torque produced by windings A and B may be expressed with the aid of equations (3) and (4). We thus obtain:

$$T = k \cdot \sin(n \cdot \alpha) \cdot [i_{ao} - g \cdot k \cdot \omega \cdot \sin(n \cdot \alpha)] - \quad (12)$$
$$k \cdot \cos(n \cdot \alpha) \cdot [i_{bo} + g \cdot k \cdot \cos(n \cdot \alpha) \cdot \omega]$$

It will be noted that this equation contains terms dependent on the speed $\omega$. By regrouping the different terms, we obtain:

$$T = k \cdot \sin(n \cdot \alpha) i_{ao} - k \cdot \cos(n \cdot \alpha) i_{bo} - \quad (13)$$
$$k \cdot g \cdot \omega [\sin(n \cdot \alpha^2 + \cos(n \cdot \alpha)^2]$$

Simplifying the last term by the well-known trigonometric equation $(\sin a)^2 + (\cos a)^2 = 1$, we obtain:

$$T = k \cdot \sin(n \cdot \alpha) i_{ao} - k \cdot \cos(n \cdot \alpha) i_{bo} - k \cdot g \cdot \omega \quad (14)$$

Comparing this expression with equation (7), we find that an additional torque term $T_f$ appears, corresponding to $$T_f = k \cdot g \cdot \omega \quad (15)$$

This torque term depends only upon the speed $\omega$, and upon the constant k and the gain g, and is of the same nature as the term $F \cdot \omega$ in equation (9), which corresponds to the viscous damping. This torque $T_f$ therefore corresponds to a damping torque of electromagnetic nature, produced by modulation of the currents of the active phase windings by the induced voltage.

It will further be noted that this damping torque $T_f$ does not depend on the position, nor on the reference currents $i_{ao}$ and $i_{bo}$. The resultant damping is therefore uniform in any position, which makes this method particularly advantageous when positions representing fractions of steps are to be attained, according to the "ministepping" method well known in the art.

FIG. 2 illustrates a preferred embodiment of the invention. A transformer 1 feeding circuitry for controlling a stepping motor has a primary winding 2 connected to the mains and a secondary winding 3 connected to a bridge-connected rectifier 4. The rectified voltage appearing at the output of rectifier 4 is filtered through a capacitor 5 before feeding two control circuits 10 and 20 which, combined with circuits 40 and 50 for measuring the induced voltage, constitute the present invention. Examples of how these circuits may be designed will be explained below.

The stepping motor, in this case a motor having two bifilar phase windings, is represented by four windings A, B, C, and D supplied through a circuit 30 of a type well known in the art. Windings A, B, C, and D are connected across resistors 12 and 26 to circuits 10 and 20 which, as will be shown below, act as voltage or current sources. The other ends of windings A, B, C, and D are respectively connected to switching transistors $T_1$ to $T_4$ by means of which the respective phase windings can be cut in and out. Diodes $D_1$ to $D_4$ are connected in parallel with switching transistors $T_1$ to $T_4$ to permit the passage of the current appearing upon the switching of magnetically coupled phase windings. The emitters of transistors $T_1$ to $T_4$ are grounded across measuring resistors R31 and R32 having low resistance.

A circuit 33 produces signals 34, 35, 36, and 37 for sequentially controlling transistors $T_1$ $T_2$, $T_3$, and $T_4$ to feed the phase windings of the motor in the sequence AB-BC-CD-DA for operation clockwise and in the sequence DA-DC-CB-BA-AD for operation counterclockwise. As windings A and C are never activated simultaneously, nor are windings B and D, the two measuring resistors 31 and 32 suffice for measuring the current passing through winding A or winding C, and through winding B or winding D, respectively. Voltages E38 and E39, collected at the terminals of measuring resistors 31 and 32, are therefore proportional to the currents flowing through the active phase windings of the motor.

Circuits 40 and 50, provided for measuring the voltage induced by the rotation of the rotor of the motor, the operation of which will be described in detail below, are associated with the active phase windings of the motor. Circuits 40 and 50 receive at their inputs signals 41 and 51, corresponding to the total voltage applied to each active phase winding, comprising in series the additional resistors 12 and 26, as well as the signals 38 and 39 corresponding to the measurement of the currents flowing through these same active phase windings.

Circuits 40 and 50 supply at their outputs signals 42 and 52 proportional to the currents measured in the active phase windings, as well as signals 43 and 53 proportional to the voltage induced by movement, present in these active phase windings.

Control circuits 10 and 20 receive these four signals 42, 43, 52, and 53 at their inputs, coming from measuring circuits 40 and 50. Circuits 10 and 20 likewise receive at their inputs a common logic signal 21. When the voltage level of signal 21 corresponds to binary "1", the voltage supplied to outputs 11 and 25 of control circuits 10 and 20 is constant and proportional to a reference value 22, common to both circuits.

In this mode of operation, circuits 10 and 20 ignore all the signals at their inputs, except for signals 21 and 22, and act as conventional voltage sources. This mode of operation is selected when the motor is to be activated at high speed, or when no damping is desired.

When, on the contrary, logic input signal 21 is at binary "0", circuits 10 and 20 act as current regulators, as will be explained in detail below, and supply at their outputs 11 and 25 currents which are respectively proportional to two reference values 23 and 24, from which circuits 10 and 20 first subtract a magnitude proportional to signals 43 and 53 corresponding to the voltages induced in the active phase windings.

In this mode of operation, the currents flowing through the active phase windings are strongly influenced by the speed of the rotor, measured indirectly by the expedient of the voltage induced by movement. As a result, a substantial electromagnetic damping torque occurs. The two reference values 22 and 23, corresponding to the currents passing through the active windings when the rotor is at rest, may be freely chosen depending upon the rest position to be attained.

It will be noted that because of the possibility of monitoring and controlling the evolution of the induced voltage at the moment when the motor stops, particularly by ensuring a certain predetermined degree of overshoot (damped during one alternation, even possibly during several alternations), the accuracy of detent positioning in particular can be improved to a not inconsiderable extent, as has been verified by tests in practice.

FIG. 3 is a schematic diagram of a possible design of control circuits 10 and 20. As these two circuits are, in fact, identical, their operation will be explained on the basis of circuit 10 alone. The operation of circuit 20 may be obtained by substituting reference numerals 25, 24, 52, and 53 for 11, 23, 42, and 43. Circuit 10, like the other circuits to be described below, is fed by a voltage source (not shown). This source supplies a positive voltage $+V_{cc}$ and a negative voltage $-V_{cc}$ relative to a mid-point connected to the ground of the circuit. These voltages are used especially for feeding the various operational amplifiers used in these circuits.

An NPN power transistor 60 is placed between the input 6 of control circuit 10, fed by the rectified voltage coming from bridge-connected rectifier 4 (FIG. 1), and the output 11, feeding windings B and D of the motor. When control logic signal 21 is at binary "1", switching elements 61 and 63 are enabled, whereas switching elements 62 and 64 are disabled. These elements take the form of MOS transistors. An inverter 66 serves the sole purpose of providing a logic signal complementary to control signal 21. This control signal may be supplied, for example, by a microprocessor which would monitor the operation of the motor and could select the mode of operation of circuits 10 and 20.

When switching elements 61 and 63 are enabled, the non-inverting input of an amplifier 65 is connected across a resistor 67 to reference voltage 22, whereas the inverting input of amplifier 65 is connected to a resistance bridge made up of resistors 70 and 71 having values R70 and R71. The circuit made up of power transistor 60, amplifier 65, switching elements 61 and 63, as well as of resistors 67, 70, and 71 and reference signal 22, acts as a voltage source, and the voltage E11 appearing at output 11 in this mode of operation may be expressed as:

$$E11 = E22 \cdot \frac{R70 - R71}{R71} \quad (16)$$

These windings B and D are fed by a DC voltage. Voltage reference 22 may take the form of a fixed voltage reference outside circuit 10.

Circuits 10 and 20 behave differently when the logic control signal is at binary "0". In this case, switching elements 61 and 63 are disabled, whereas elements 62 and 64 are enabled. The non-inverting input of amplifier 65 is connected across resistor 67 to reference signal 23, of voltage E23, whereas its inverting input is connected through switching element 64 to signal 42, coming from measuring circuit 40 across a resistor 68, and to signal 43, likewise coming from measuring circuit 40, across a resistor 69.

Measuring circuit 40, which will be described in detail below, supplies signal 42, the voltage E42 of which is proportional to the current $i_{bd}$ circulating in the active one of phase windings B and D, and satisfies the following equation:

$$E42 = ki \cdot i_{bd} \quad (17)$$

wherein ki is a constant depending on the value of measuring resistor 31 (FIG. 2) and upon the internal characteristics of circuit 40. Signal 43, the voltage E43 of which is proportional to the voltage induced by movement measured in the active phase winding of windings B or D, is likewise supplied by measuring circuit 40. If $E_{mbd}$ designates this induced voltage, voltage E43 may be expressed as:

$$E43 = km \cdot E_{mbd} \quad (18)$$

wherein km is a constant dependent upon the internal characteristics of circuit 40, which constant may be freely selected.

It will now be shown that the circuit made up of transistor 60, amplifier 65, switching elements 62 and 64, resistors 67, 68, 69, and responding to signals 23, 42, and 43, acts as a current source and makes it possible to control the current $i_{bd}$ flowing through the active phase winding. Assuming, to start with, that voltage E43 is nil and that resistors 68 and 69 are of equal value, voltage E72 present at inverting input 72 of amplifier 65 may be expressed as:

$$E72 = \tfrac{1}{2} \cdot E42 = \tfrac{1}{2} \cdot ki \cdot i_{bd} \quad (19)$$

If voltage E72 is less than reference voltage E23 applied to the non-inverting input of amplifier 65, voltage E73 at output 73 of the latter will increase as a function of its gain. As transistor 60 is connected as an emitter-follower, voltage E11 at output 11 of circuit 10 will likewise increase, causing in turn an increase in current $i_{bd}$ flowing through the winding. Current $i_{bd}$ will increase until voltage E72 is equal to reference voltage E23. We shall then have:

$$E23 = E72 = \tfrac{1}{2} \cdot ki \cdot i_{bd} \quad (20)$$

Reference voltage E23 therefore makes it possible to control the current passing through the active phase winding. This reference voltage can be produced, for example, by means of a digital-to-analog converter controlled by the microprocessor monitoring the motor. Different reference currents, corresponding to different positions of equilibrium, may thus easily be chosen.

When measuring signal 43, corresponding proportionally to the voltage $E_{mbd}$ induced by movement, is other than zero, voltage E72, present at the inverting input of amplifier 65, may be expressed as:

$$E72 = \tfrac{1}{2} \cdot (E42 + E43) = \tfrac{1}{2} \cdot (ki \cdot i_{bd} + km \cdot E_{mbd}) \quad (21)$$

The value of current $i_{bd}$ applied to the winding will therefore be:

$$i_{bd} = \frac{2 \cdot E23}{ki} - \frac{km \cdot E_{mbd}}{ki} \quad (22)$$

Current $i_{bd}$ flowing through active phase winding B or D is therefore proportional to reference voltage E23, from which the circuit previously subtracts a magnitude proportional to the voltage $E_{mbd}$ induced by movement, measured by circuit 40. Circuits 10 and 20 therefore make it possible to produce regulators which create, through verification of the current flowing through the active phase windings, an electromagnetic type of damping in conformity with the method explained earlier.

It will be readily understood that other circuit embodiments can also perform the functions described above. One particular advantage of the preferred embodiment, however, is the use of elements already present in the voltage regulator, generally feeding the control circuit of the motor, to produce a source of controlled current. Thus, the power transistor and the regulating amplifier are used for those two functions. Moreover, the heat losses, which are particularly high when the regulating circuit operates as a current source, are borne by the power transistor, already designed for that purpose and situated at an appropriate location for eliminating the heat.

FIG. 4 is a diagram of a possible design for circuit 40 measuring the voltage induced by movement. As circuits 40 and 50 are, in fact, identical, their detailed operation will be explained with reference to circuit 40 alone. It suffices, however, to replace the connections bearing reference numerals 39, 41, 42, and 43 by the connections with reference numerals 38, 51, 52, and 53 in order to obtain the detailed operation of circuit 50. It will likewise be noted that as phase windings B and D are never cut in simultaneously in the mode of operation selected, a single measuring circuit can be used for measuring the voltage $E_{mbd}$ induced by movement in the active one of windings B and D. Circuit 50 effects the same measurement for windings A and C.

Let it be assumed, by way of example, that winding D is cut in. In this case, transistor $T_4$ is enabled, and the current coming from control circuit 10 via connection 11 passes successively through additional resistor 12, phase winding D, transistor $T_4$ and measuring resistor 31. Additional resistor 12 is used when it is desired to reduce the electrical time constant associated with the phase windings of the motor. Measuring resistor 31 generally has low resistance, and voltage E31 collected at the terminals of that resistor is applied via connection 39 to amplifier 80. The latter therefore produces at its output 86 a voltage E86 proportional to the current circulating in the active winding, in this instance phase winding D. The gain of amplifier 80 is so chosen that voltage E86 at its output is equal to voltage E11 applied to winding D and to the elements connected in series therewith when the current flowing through the active phase winding is equal to $E11/R_d$, wherein $R_d$ represents the sum of the resistances in series in the circuit associated with winding D, comprising more particularly resistor 12, and resistor 31, as well as the inherent resistance of winding D itself.

Output 86 of amplifier 80 is connected to a switching element 87, to outside connection 42, and to the inverting input of a differential amplifier 82. The output of switching element 87 is connected to the non-inverting input of an amplifier 81 connected as a voltage follower. A resistor 88 and a capacitor 89 are likewise connected to this non-inverting input of amplifier 81. The second terminal of resistor 88 is joined to connection 11, feeding the winding from circuit 10, whereas the second terminal of capacitor 89 is grounded. Thus, at the terminals of the circuit composed of resistor 88 and capacitor 89, the same voltage prevails as at the terminals of the circuit comprising resistor 12, winding D, switching transistor $T_4$, and measuring resistor 31.

Output 90 of amplifier 81, connected as a voltage follower, is connected to the non-inverting input of amplifier 82, the output of which is connected to switching element 96. The output of this switching element is connected to the non-inverting input of an amplifier 83 connected as a voltage follower. A capacitor 92 is likewise connected between the non-inverting input of amplifier 83 and ground and, with the aid of switching element 96, makes it possible to sample the signal at the output of amplifier 82 and to store it in capacitor 92. Signals 94 and 95 coming from a circuit 93 and controlling the enabling of switching elements (typically transmission-gates) 87 and 96, will be described in detail below.

The operation of measuring circuit 40 will now be explained with reference to FIG. 5. Curve 100 in FIG. 5 shows signal E86 obtained at the output of measuring amplifier 80, proportional to the current flowing through the active phase winding of the motor—in this instance, winding D. The current furthermore satisfies the equation:

$$E11 = R_d \cdot i_d + L \cdot \frac{di_d}{dt} + E_{mbd} \qquad (23)$$

wherein E11 is the voltage feeding the phase winding and the elements connected in series therewith, $R_d$ is the total resistance associated with that winding, and L is its inductance. $E_{mbd}$ designates the voltage induced by movement, unknown to start with, and to be measured. Curve 101 in FIG. 5 represents the waveform that current $i_d$ of winding D would have if induced voltage $E_{mbd}$ were nil starting from the moment $t_o$. In this case, the current would be governed by the equation:

$$E11 = R_d \cdot i_o + L \cdot \frac{di_o}{dt} \qquad (24)$$

the solution of which is an exponential increase of the current toward the asymptotic value $E11/R_d$. Curve 101 likewise represents the voltage which would exist at the terminals of capacitor 89 if switching element 87 had been enabled until $t_o$ and thereafter disabled.

The voltage at the output 91 of differential amplifier 82 corresponds to the difference between voltages E90 and E86 and is therefore nil as long as curves 100 and 101 coincide, which is the case when switching element 87 is enabled.

It will now be shown that the voltage $E_{mbd}$ induced by movement in the active phase winding at the moment $t_o$ when enabled gate 87 becomes disabled, is proportional to the difference between the values of curves 100 and 101 a short time dt after $t_o$.

It is first assumed that voltage $E_{mbd}$ varies sufficiently showly in time for it to be considered constant during the interval between $t_o$ and $t_o+dt$, and its value during this interval shall be designated as $E_{mbdo}$. Under these conditions, equation (23) admits of a solution between $t_o$ and $t_o+dt$ which may be described as $$i_d(t) = i_{dto} \cdot e^{-(\frac{t-t_o}{T_e})} + \left(\frac{E11 - E_{mbdo}}{R_d}\right) \cdot \left[1 - e^{-(\frac{t-t_o}{T_e})}\right] \qquad (25)$$

wherein $i_{dto}$ is the value of the current i(t) at the moment $t_o$, and $T_e$ is the time constant associated with the phase. This equation shows that current $i_d$ converges exponentially, starting from the value $i_{do}$, toward the asymptotic value $(E11-E_{mbdo})/R_d$, would be the value attained by the current in an infinite time if induced voltage $E_{mbd}$ remained permanently equal to its value $E_{mbdo}$ at moment $t_o$.

As current $i_d$ in winding D produces a voltage E86 at the output of measuring amplifier 80 which, through the choice of the gain made previously, has the value $E86 = R_d \cdot i_d$, the value of voltage E86 between $t_o$ and $t_o + dt$ may likewise be expressed as:

$$E86 = R_d \cdot i_d \cdot e^{-(\frac{t-t_o}{T_e})} + (E11 - E_{mbdo}) \cdot \left[1 - e^{-(\frac{t-t_o}{T_e})}\right] \quad (26)$$

The voltage at the terminals of capacitor 89 may also be easily expressed. At moment $t_o$, as switching element 87 passes from the enabled to the disabled state, voltage E89 has the value $$E89 = E86 = R_d \cdot i_{do} \quad (27)$$

Voltage E89 at the terminals of the capacitor then increases toward the asymptotic value E11 according to the equation:

$$E89 = R_d \cdot i_{do} \cdot e^{-(\frac{t-t_o}{T_{rc}})} + E11 \cdot \left[1 - e^{-(\frac{t-t_o}{T_{rc}})}\right] \quad (28)$$

$T_{rc}$ designates the time constant associated with the circuit comprising capacitor 89 and resistor 88, $T_{rc}$ being equal to R88·C89. If $T_{rc}$ is chosen equal to $T_e$, the time-phase displacement constant associated with the phase winding, the exponential terms of equations (26) and (28) are of the same nature, and it is easy to calculate voltage E91 appearing at the output of amplifier 82, viz., $$E91 = E90 - E86 \quad (29)$$

and as E90=E89 since amplifier 81 is connected as a voltage follower, we can calculate E90 with the aid of equations (26) and (28). We therefore obtain:

$$E91 = E_{mbdo} \cdot \left[1 - e^{-(\frac{t-t_o}{T_e})}\right] \quad (30)$$

If we wish to know more precisely what voltage E91 is at moment $t_o + dt$, we may replace the exponential expression, as long as dt is much smaller than $T_e$, by the following equation:

$$\left(1 - e^{-\frac{dt}{T_e}}\right) = \frac{dt}{T_e} \quad (31)$$

The value of voltage E91 at the output of amplifier 82 at moment $t_o + dt$ will thus be $$E91 = E_{mbdo} \cdot \frac{dt}{T_e} \quad (32)$$

This last equation shows clearly that voltage E91 at the output of differential amplifier 82 a short moment dt after switching element 87 has been disabled is proportional to the instantaneous value $E_{mbdo}$ of induced voltage $E_{mbd}$ at moment $t_o$. At moment $t_o + dt$, voltage E91 is sampled by enabling switching element 96 very briefly, so that capacitor 92 can be charged with voltage E91. Element 96 is then disabled, and voltage E91 at moment $t_o + dt$ is thus stored until the next measurement cycle. The measuring time dt selected must therefore be long enough for voltage E91 at moment $t_o + dt$ to be sufficiently great, and short enough for the requirement $dt << T_e$ to be met.

The cycle for measuring induced voltage $E_{mbd}$ therefore consists in enabling switching element 87 briefly at time $t_o$ and sampling voltage E91, present a moment dt later at the output of differential amplifier 82, by enabling switching element 96 very briefly. At that moment, the result of the measurement cycle is stored in capacitor 92, and a new cycle can be commenced. Tests have shown that the frequency of the measurement cycle may reach a value higher than 10 KHz. The evolution of the voltage induced by movement can therefore be faithfully reconstituted with the aid of numerous samples obtained from the various measurements.

FIG. 6 is a circuit diagram illustrating a possible design of circuit 93, which supplies signals 94 and 95, also appearing in FIG. 7, to measuring circuits 40 and 50. An oscillator 110 supplies a logic signal 113, the frequency of which is so chosen as to guarantee proper operation of circuits 40 and 50. Tests have shown that good results can be obtained with frequencies from 10 to 100 kc/s. The frequency supplied by oscillator 110 is therefore not critical, hence it is equally possible to use other signals of fixed frequency which may already be present in the system.

Fixed-frequency signal 113 is connected to the input of a monostable flip-flop 111. The latter is arranged so that its Q output, designated by reference numeral 115, changes to binary "1" and remains there for a very brief period of 3 to 5 μs every time signal 113 at its input changes from "0" to "1". The $\overline{Q}$ output of flip-flop 111, designated by reference numeral 114, is connected to the input of a second monostable flip-flop 112, the Q output 116 of which likewise changes to "1" and remains there for a brief period of 3 to 5 μs every time the signal at its input changes from "0" to "1". This is the case when Q output 115 of the first flip-flop 111 changes from "1" to "0". Signals 115 and 116 appearing at the Q outputs of flip-flops 111 and 112 are therefore made up of very short "1" pulses of the same frequency but time-shifted.

As a period of time must elapse between the actuation of the first switching element, 87, and the second one, 96, signal 116 appearing at the output of the second flip-flop, is used to actuate switching element 87 (signal 94), and signal 115 to actuate switching element 96 (signal 95). The lapse of time between a pulse of signal 116 and the following pulse of signal 115 therefore corresponds to the measuring time dt.

Although the preferred embodiment is described above with reference only to a stepping motor having four bifilar windings, the scope of the method of the present invention is not limited to that particular case. The method may easily be applied to other types of stepping motors, as well as to any multiphase motor or to electromechanical transducers, the phase winding(s) of which are the site of voltages induced by movement. The particular method of detecting the induced voltage on the basis of two consecutive samples of the current flowing through a phase winding has the advantage of being insensitive to disturbances caused by phase commutation which might have taken place before the measurement cycle, and it can advantageously be used to measure the voltage induced by movement in phase windings where the current undergoes frequent interruptions owing to frequent switching.

What is claimed is:

1. A method of improving damping upon stopping of the movement of the rotor of a multiphase motor having a plurality of stator phase windings magnetically coupled to the rotor, through which windings currents are allowed to flow, comprising the steps of:

measuring the voltages induced in the stator windings by the movement of the rotor, and imparting to said currents in the stator windings values depending on the measurements of the induced voltages, the current applied to a cut-in phase winding being proportional to the algebraic sum of a reference value and a magnitude proportional to the value of the induced voltage measured on that same winding.

2. The method of claim 1, wherein the step of measuring the induced voltage in a phase winding comprises:

producing a first signal proportional to the current flowing through the phase winding at a first moment, producing a second signal proportional to the current which would flow at a second moment subsequent to the first moment if the induced voltage had been zero between the first and second moments, producing a third signal proportional to the current actually flowing through the phase winding at the second moment, and producing a fourth signal proportional to the difference between the second and third signals, said fourth signal being proportional to the induced voltage occurring in the phase winding between the first and second moments due to the movement of the rotor.

3. A method of improving damping upon stopping of the movement of the rotor of a multiphase motor having a plurality of stator phase windings magnetically coupled to the rotor, through which windings currents are allowed to flow, oomprising the steps of:

measuring the voltages induced in the stator windings by the movement of the rotor, using the induced voltages to establish in dependence thereon values to be imparted to the different currents in the stator windings, and further comprising the combined steps of imparting to the current in a cut-in phase winding a value proportional to the algebraic sum of a reference value and a magnitude proportional to the instantaneous value of the induced voltage ascertained in said phase winding and effecting the ascertainment of said induced voltage by means of point-by point sampling on the basis of a repetitive comparison, over successive elementary intervals of time, between the actual evolution of the value of the current and the simulated evolution which the value of the current would follow in the absence of induced voltage.

4. The method of claim 3, wherein said sampling of the induced voltage in a given phase winding comprises the steps of:

producing a first signal proportional to the current flowing through said phase winding at a first moment, producing a second signal proportional to the current which would flow at a second moment subsequent to the first moment if the induced voltage had been zero between the first and second moments, producing a third signal proportional to the current actually flowing through the phase winding at the second moment, and producing a fourth signal proportional to the difference between the second and third signals, this fourth signal being proportional to the induced voltage occurring in the phase winding between the first and second moments due to the movement of the rotor.

5. The method of claim 3, wherein said values to be imparted to the different currents in dependence upon the induced voltages begin to be imparted no earlier than starting from the last change of control state intended to stop the rotor.

6. A control device for damping the movement of a rotor being stopped in a multiphase motor having a plurality of stator phase windings magnetically coupled to said rotor, comprising means for selectively activating different ones of said windings and for applying currents to the activated phase windings of said motor, induced voltage ascertainment or measurement means for ascertaining the induced voltages produced by the movement of said rotor in the different ones of said phase windings, and means for modifying the values of said currents in said phase windings in response to signals supplied by said ascertainment or measurement means, said means for modifying the value of the current in each of said phase windings comprising a circuit operative to produce a current whose magnitude is the algebraic sum of a reference value and a magnitude proportional to the induced voltage in said phase winding.

7. The device of claim 6, wherein said induced voltage ascertainment or measurement means comprises, for each said phase winding, means for producing a first signal proportional to the current flowing through the phase winding at a first moment, means for producing a second signal proportional to the current which would flow at a second moment subsequent to the first moment if the induced voltage had been zero between the first and second moments, means for producing a third signal proportional to the current actually flowing through the phase winding at the second moment, and means for producing a fourth signal proportional to the difference between the second and third signals, said fourth signal being proportional to the induced voltage occurring in the phase winding between the first and second moments due to the movement of the rotor.

8. The device of claim 6, wherein said means for modifying the values of said currents in response to signals supplied by said induced voltage ascertainment or measurement means are so controlled as to become operative starting from the last change of control state intended to stop said motor.

9. The device of claim 7, wherein said means for modifying the values of said currents in response to signals supplied by said induced voltage ascertainment or measurement means are so controlled as to become operative starting from the last change of control state intended to stop said motor.

10. The device of claim 6, wherein said means for modifying the values of said currents in response to said signals supplied by said induced voltage ascertainment or measurement means are adapted to become operative starting from a moment such that the movement of said rotor reaching its stopping position comprises an overshoot of predetermined and monitored extent.

11. The device of claim 7, wherein said means for modifying the values of said currents in response to said signals supplied by said induced voltage ascertainment or measurement means are adapted to become operative starting from a moment such that the movement of said rotor reaching its stopping position comprises an overshoot of predetermined and monitored extent.

* * * * *